US012654298B2

(12) United States Patent
Torrez et al.

(10) Patent No.: US 12,654,298 B2
(45) Date of Patent: Jun. 16, 2026

(54) REMOVAL TOOLS

(71) Applicant: Toyota Motor Engineering & Manufacturing North America, Inc., Plano, TX (US)

(72) Inventors: Vincent L. Torrez, San Antonio, TX (US); Ricardo Paez, San Antonio, TX (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 442 days.

(21) Appl. No.: 18/175,891

(22) Filed: Feb. 28, 2023

(65) Prior Publication Data

US 2024/0286260 A1 Aug. 29, 2024

(51) Int. Cl.
*B66F 15/00* (2006.01)
*B25C 11/00* (2006.01)

(52) U.S. Cl.
CPC .................................... *B25C 11/00* (2013.01)

(58) Field of Classification Search
CPC ................................. B66F 15/00; B25C 11/00
See application file for complete search history.

(56) References Cited

U.S. PATENT DOCUMENTS 1,641,252 A * 9/1927 Dickey .................. B25B 13/08
81/125
3,817,078 A 6/1974 Reed et al.
6,298,512 B1 10/2001 Hagen
6,324,741 B1 12/2001 Brown
7,185,879 B1 * 3/2007 Lejuez .................... B25C 11/00
254/21
7,409,893 B2 8/2008 Maymon
7,735,806 B2 * 6/2010 Prater ..................... B66F 15/00
29/270

(Continued)

FOREIGN PATENT DOCUMENTS

DE 102012016881 A1 2/2014
KR 19980031514 U 8/1998

OTHER PUBLICATIONS

38Pcs Removal tool dash audio interior fastener clip panel for automotive, https://www.daraz.lk/products/38pcs-removal-tool-dash-audio-interior-fastener-clip-panel-for-automotive-i121492581.html, Jul. 5, 2022.

(Continued)

*Primary Examiner* — Lee D Wilson
(74) *Attorney, Agent, or Firm* — DINSMORE & SHOHL LLP

(57) ABSTRACT

A removal tool is provided. The removal tool includes a tool body extending in a longitudinal direction having an engagement portion at one end and defining an opening at the other end. The engagement portion includes two prongs and defines a notch portion formed between the prongs at a distal end portion. The notch portion extends in the longitudinal direction and rounded at a proximal end portion, each prong has a cut out portion at the distal end portion horizontally tapered toward the notch portion. The distal end portion has a tapered portion vertically tapered away from the distal end portion.

12 Claims, 3 Drawing Sheets

(56) References Cited

U.S. PATENT DOCUMENTS

| | | | | |
|---|---|---|---|---|
| 8,567,029 | B2 * | 10/2013 | Oymaian | B25B 27/14<br>81/3.55 |
| 8,567,760 | B2 * | 10/2013 | Sindt | B25C 11/00<br>254/25 |
| D703,501 | S * | 4/2014 | Junyong | D8/28 |
| 2008/0217592 | A1 * | 9/2008 | Chambers | B25C 11/00<br>7/166 |
| 2013/0139326 | A1 * | 6/2013 | Allen | B25F 1/00<br>7/151 |

OTHER PUBLICATIONS

Camorf, upholstery removal set, improved version, interior removal, panel removal, resin, car interior lining, removing tools, car maintenance, furniture panel, upholstery, clip clamp tool, power seed, wiring guide included + storage bag, https://www.ubuy.vn/en/product/30BH24VK-camorf-upholstery-removal-set-improved-version-interior-removal-panel-removal-made-of-resin-car-upho.

* cited by examiner

REMOVAL TOOLS

TECHNICAL FIELD

The present specification generally relates to removal tools and more specifically, removal tools for removing fasteners.

BACKGROUND

Various tools are used to remove or repair various types of fasteners. However, sometimes tools damage fasteners during removal or repair. For example, tools may twist, bend, or cut fasteners and the damaged fasteners may not be reusable.

SUMMARY

In one embodiment, a removal tool is provided. The removal tool includes a tool body extending in a longitudinal direction having an engagement portion at one end and defining an opening at the other end. The engagement portion includes two prongs and defines a notch portion formed between the prongs at a distal end portion. The notch portion extends in the longitudinal direction and is rounded at a proximal end portion. Each prong has a cut out portion at the distal end portion horizontally tapered toward the notch portion. The distal end portion has a tapered portion vertically tapered away from the distal end portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
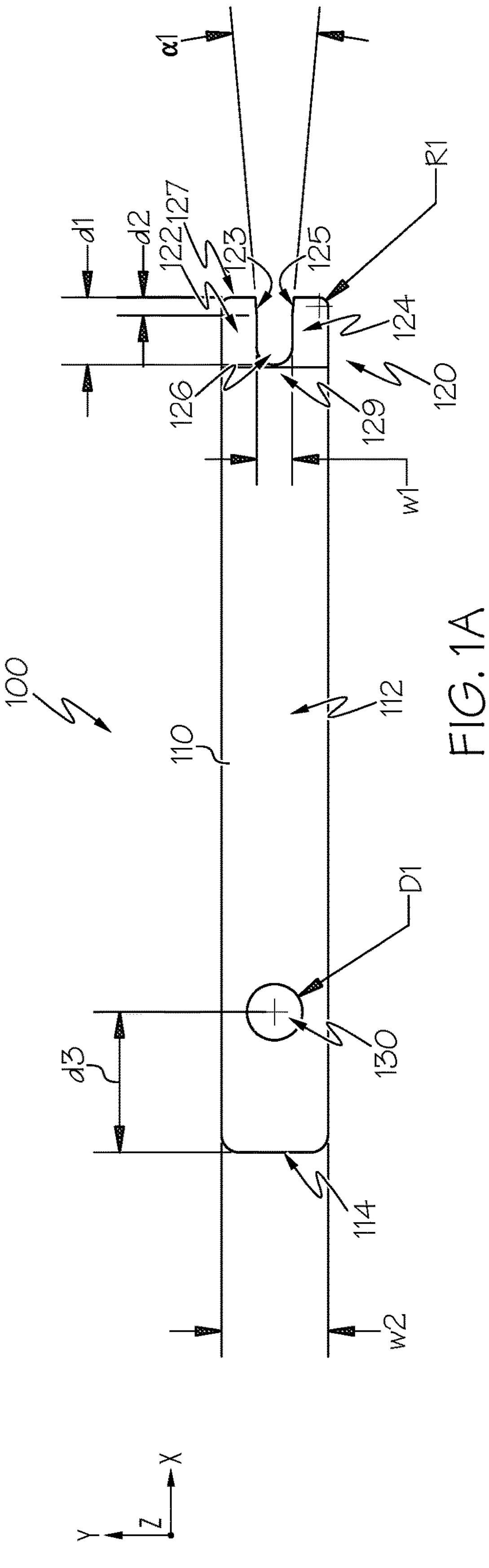
FIG. 1A depicts a top view of a removal tool according to one or more embodiments shown and described herein.
Figure 1B:
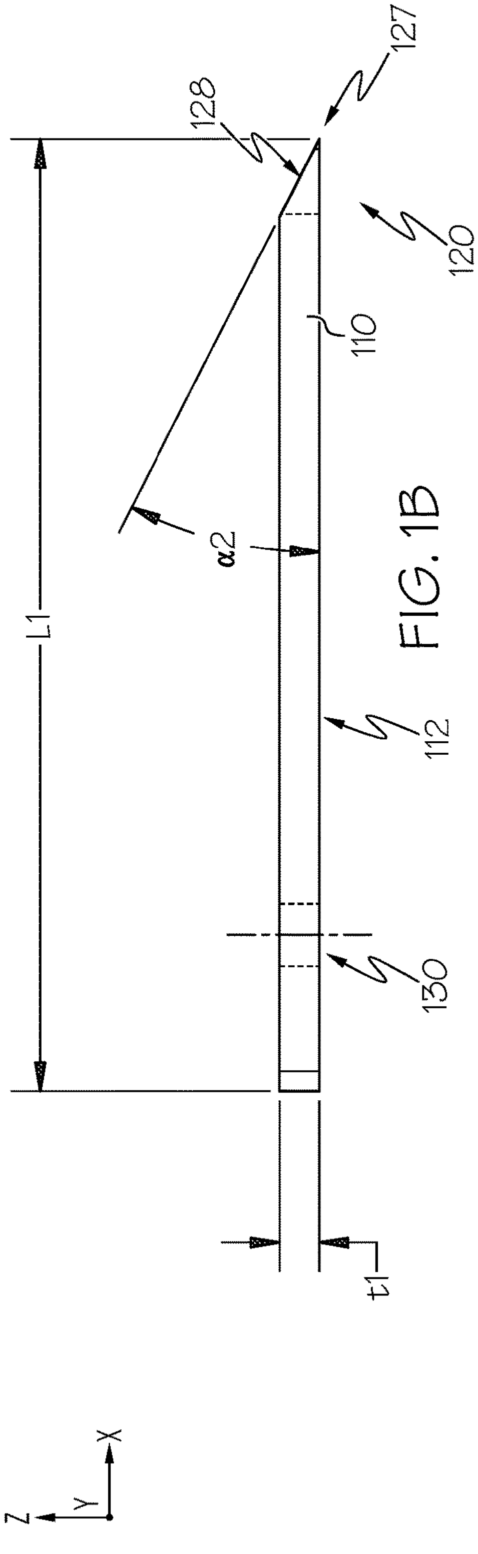
FIG. 1B depicts a side view of the removal tool of FIG. 1A according to one or more embodiments shown and described herein.

FIGS. 1A-1B generally depict one embodiment of a removal tool for removing various fasteners. The removal tool generally comprises a tool body including an engagement portion at one end and an opening portion at the other end. The engagement portion and the opening portion each may be configured to remove or release fasteners. The removal tool may be a multi-functional tool. For example, the engagement portion may remove a fastener that is different from a fastener that is removable by the opening portion. Various embodiments of the removal tool and the operation of the removal tool will be described in more detail herein.

Referring now to FIG. 1A, a removal tool 100 includes a tool body 110. The tool body 110 extends in a longitudinal direction (e.g., an X direction of the coordinate axes in FIG. 1A) of the removal tool 100. In embodiments, the removal tool 100 may be used to remove fasteners including, but not limited to, clips (e.g., wire harness clips, push pin clips, or the like), grommets, or the like. The tool body 110 has an engagement portion 120 at one end of the tool body 110 and defines an opening 130 at the other end of the tool body 110. In embodiments, the engagement portion 120 may be used to remove grommets, and the opening 130 may be used to remove clips. The tool body 110 may have a handle portion 112 which a user may hold to operate the removal tool 100.

The engagement portion 120 includes two prongs 122, 124, and defines a notch portion 126 formed between the prongs 122, 124 at a distal end portion 127 of the engagement portion 120. The notch portion 126 extends in the longitudinal direction (e.g., the X direction of the coordinate axes of FIG. 1A) and is rounded at a proximal end portion 129. In embodiments, the proximal end portion 129 may be rounded to have a half-circle shape or a half-oval shape. The shape of the proximal end portion 129 may be designed to fit fasteners to be removed. The shapes of the proximal end portion 129 may be designed to fit a contacting surface of the fasteners.

Each of the prongs 122, 124 has a cut out portion (e.g., a cut out portion 123 of the prong 122, a cutout portion 125 of the prong 124) at the distal end portion 127 of the engagement portion 120. The cutout portions 123, 125 are horizontally tapered toward the notch portion 126. In embodiments, the cutout portions 123, 125 are angled at an angle $\alpha$1 to fit fasteners to be removed. The angle $\alpha$1 is formed between a reference line extending parallel to the cutout portion 123 and a reference line extending parallel to the cutout portion 125. The cutout portions 123, 125 are symmetrically formed in a longitudinal direction (e.g., the X direction of the coordinate axes of FIG. 1A). The angle $\alpha$1 may be between 5° to 15°. The angle $\alpha$1 may be about 10°. The prongs 122, 124 may be shaped symmetrical in the longitudinal direction (e.g., the X direction of the coordinate axes of FIG. 1A). In embodiments, the width w1 may be between 18 mm to 20 mm. For example, the width w1 may be about 19.05 mm and the width w2 may be about 6.35 mm. In embodiments, a width w1 of the notch portion 126 may be about ⅓ of a width w2 of the tool body 110. In embodiments, a length d1 of the notch portion 126 may be between 11 mm and 13 mm. The length d1 may be about 12 mm. In embodiments, a length d2 of the cutout portions 123, 125 in the longitudinal direction (e.g., the X direction of the coordinate axes of FIG. 1A) may be between 3 mm to 4 mm. The length d2 may be about 3.18 mm.

The opening 130 may be a through hole and may be disposed a distance d3 away from an end portion 114 of the tool body 110. In embodiments, the distance d3 may be between 5 mm to 30 mm. The distance d3 may be about 25 mm. In embodiments, the opening 130 may be a circle having a diameter DI between 9 mm to 11 mm. The diameter DI may be about 10 mm. In embodiments, the opening 130 may have a non-circle shape, for example but not limited to, an oval, an oblong, or any other shapes that are suitable for removing a fastener. The opening 130 may be disposed in the middle of the tool body 110 in a width direction (e.g., an Y direction of the coordinate axes of FIG. 1A). The tool body 110 may have rounded corners at the end portion 114.

Referring to FIG. 1B, a side view of the removal tool 100 is depicted. The distal end portion 127 has a tapered portion 128 vertically tapered away from the distal end portion 127. In embodiments, the tapered portion 128 is tapered at an angle α2 between 22° to 32°. The angle α2 is formed between the tapered portion 128 and the tool body 110. In other words, the tapered portion 128 is angled at the angle α2 with respect to the tool body 110. The angle α2 may be about 27°. In embodiments, a thickness t1 is may be between 6 mm to 7 mm. The thickness t1 may be about 6.35 mm. A length L1 of the removal tool 100 may be between 150 mm to 160 mm. The length L1 may be about 152.4 mm.

Figures 2A, 2B, 2C:
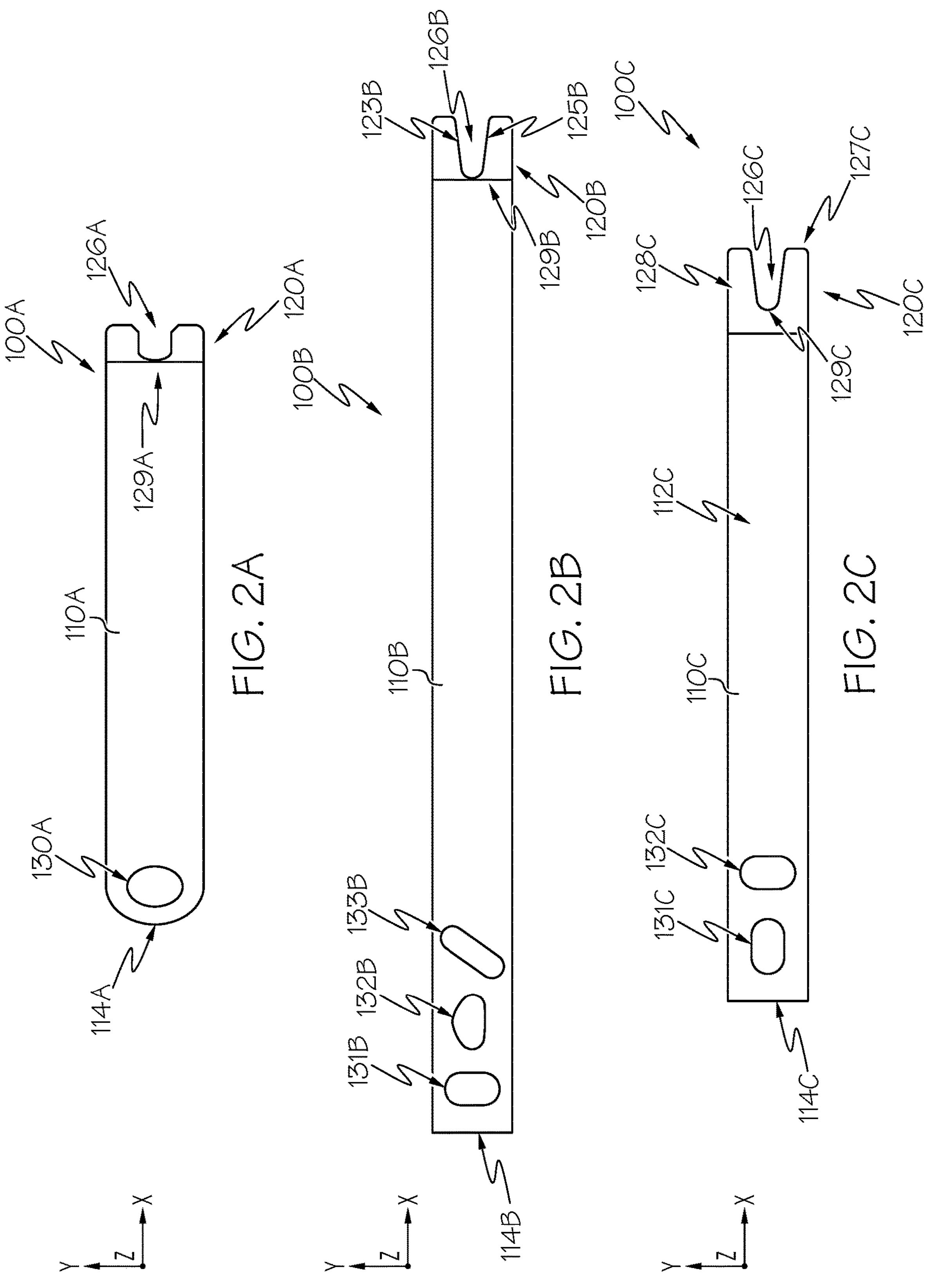
FIG. 2A depicts a top view of a removal tool with an oblong hole according to one or more embodiments shown and described herein.
FIG. 2B depicts a top view of a removal tool with a plurality of holes with different shapes according to one or more embodiments shown and described herein.
FIG. 2C depicts a top view of a removal tool with a plurality of holes with different angles according to one or more embodiments shown and described herein.

Referring to FIG. 2A-2C, various embodiments of the removal tool 100 are depicted. Unless noted otherwise, the configurations of the removal tools 100A, 100B, and 100C are the same as those described in the embodiments of the removal tool 100, thereby omitted detailed descriptions.

In FIG. 2A, a removal tool 100A includes a tool body 110A. The tool body 110A extends in a longitudinal direction (e.g., an X direction of the coordinate axes in FIG. 2A) of the removal tool 100A. The tool body 110A has an engagement portion 120A at one end of the tool body 110A and defines an opening 130A at the other end of the tool body 110A. The opening 130A may be a through hole and may be disposed at an end portion 114A of the tool body 110A. In embodiments, the opening 130A has an oval shape. The tool body 110A may the end portion 114A rounded along the shape of the opening 130A. For example, the end portion 114A may be formed in a shape along an outer periphery of the opening 130A. An outer periphery of the end portion 114A and the outer periphery of the opening 130A may be parallel to each other. A distance between the outer periphery of the end portion 114A and the outer periphery of the opening 130A may be constant at the end portion 114A.

In embodiments, a notch portion 126A extends in the longitudinal direction (e.g., the X direction of the coordinate axes of FIG. 2A) and is rounded at a proximal end portion 129A. In embodiments, the proximal end portion 129A may be rounded to have a non-semi-circle shape. For example, the shape of the proximal end portion 129A may be two quarter circles connected by a straight line. For another example, the proximal end portion 129A may have a half-oval shape.

Referring now to FIG. 2B, a removal tool 100B includes a tool body 110B. The tool body 110B extends in a longitudinal direction (e.g., an X direction of the coordinate axes in FIG. 2B) of the removal tool 100B. The tool body 110B has an engagement portion 120B at one end of the tool body 110B and defines a plurality of openings 131B, 132B, 133B at the other end of the tool body 110B. The openings 131B, 132B, 133B may be through holes and may be disposed at an end portion 114B of the tool body 110B. In embodiments, the openings 131B, 132B, 133B may have different shapes. For example, the opening 131B may be an oblong hole elongated in a width direction (e.g., an Y direction of the coordinate axes in FIG. 2B) of the removal tool 100B. The opening 132B may be a hole elongated in the longitudinal direction (e.g., the X direction of the coordinate axes in FIG. 2B) of the removal tool 100B. The opening 132B may be an elongated hole with one side extending along the longitudinal direction and the other side extending along the longitudinal direction and the width direction. In other words, the opening 132B may include a straight periphery portion and a rounded periphery portion. The opening 133B may be a hole elongated in a diagonal direction intersecting the longitudinal direction and the width direction (e.g., the X direction and the Y direction of the coordinate axes in FIG. 2B). The openings 131B, 132B, 133B may be formed in different combinations of above stated holes in various shapes.

In embodiments, a periphery of the end portion 114B may have angled corners. In embodiments, a notch portion 126B extends in the longitudinal direction (e.g., the X direction of the coordinate axes of FIG. 2B) and is rounded at a proximal end portion 129B. In embodiments, the proximal end portion 129B may be rounded to have a semi-circle shape. For example, the shape of the proximal end portion 129B may be a half circle. In embodiments, the cutout portions 123B, 125B are horizontally tapered toward the notch portion 126B. In embodiments, the cutout portions 123B, 125B may extend to connect with the proximal end portion 129B. For example, the cutout portions 123B may be connected to an end of the proximal end portion 129B (e.g., one end of the half circle), the cutout portions 125B may be connected to the other end of the proximal end portion 129B (e.g., the other end of the half circle).

Referring to FIG. 2C, a removal tool 100C includes a tool body 110C. The tool body 110C extends in a longitudinal direction (e.g., an X direction of the coordinate axes in FIG. 2C) of the removal tool 100C. The tool body 110C has an engagement portion 120C at one end of the tool body 110C and defines a plurality of openings 131C, 132C at the other end of the tool body 110C. The openings 131C, 132C may be through holes and may be disposed at an end portion 114C of the tool body 110C. In embodiments, the openings 131C, 132C may have different shapes. For example, the opening 131C may be an oblong hole elongated in a longitudinal direction (e.g., an X direction of the coordinate axes in FIG. 2C) of the removal tool 100C. The opening 132C may be an oblong hole elongated in a width direction (e.g., an Y direction of the coordinate axes in FIG. 2C) of the removal tool 100C. The openings 131C, 132C may be formed in different combinations of above stated holes in various shapes.

In embodiments, the engagement portion 120C may have a tapered portion 128C vertically tapered away from the distal end portion 127C. In embodiments, the tapered portion 128C may extend in a proximal direction. For example, the tapered portion 128C may extend to a portion away from a proximal end portion 129 in a proximal direction (e.g., a-X direction of the coordinate axes in FIG. 2C) toward a middle portion (e.g., a handle portion 112C) of the tool body 110C.

Figure 3A:
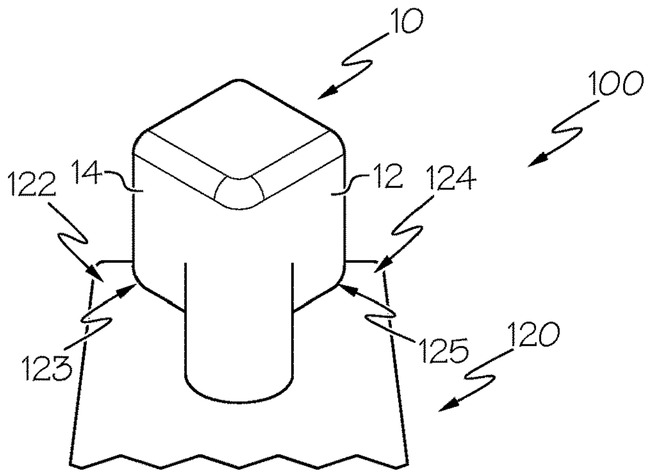
FIG. 3A depicts a perspective view of the removal tool of FIG. 1A being used to remove a fastener according to one or more embodiments shown and described herein.
Figure 3B:
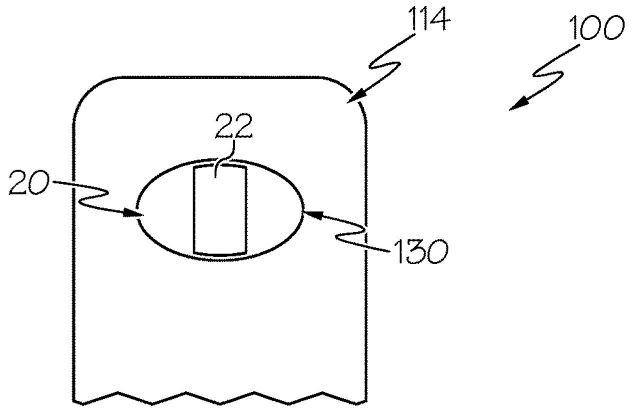
FIG. 3B depicts a perspective view of the removal tool of FIG. 2A being used to remove a fastener according to one or more embodiments shown and described herein.
Figure 3C:
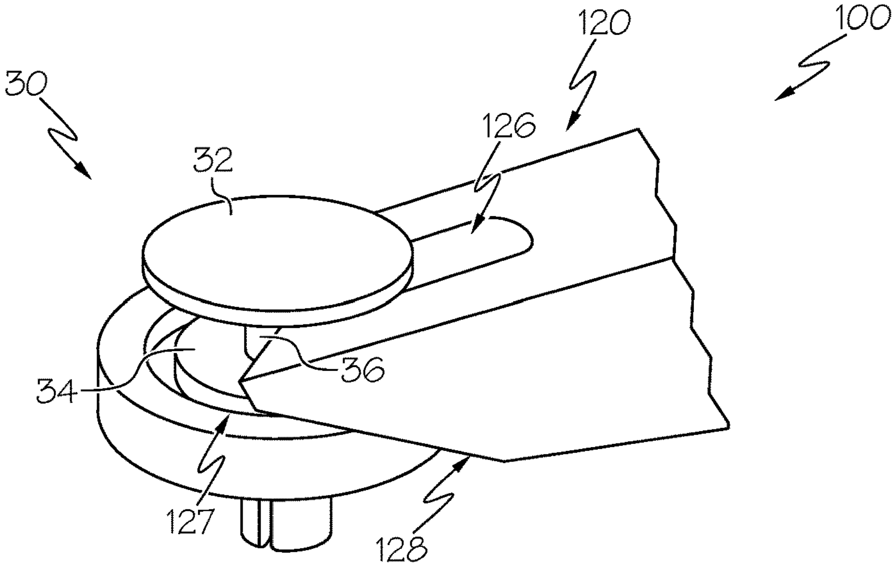
FIG. 3C depicts a perspective view of the removal tool of FIG. 1A being used to remove a fastener according to one or more embodiments shown and described herein.

In FIGS. 3A-3C, various use cases are depicted. In embodiments, the removal tool 100 may remove a plurality of different types of fasteners thereby providing a multi-purpose removal tool (e.g., the removal tool 100). Referring to FIG. 3A, the engagement portion 120 of the removal tool 100 may be used to remove a fastener 10 (e.g., a grommet, or the like). Side surfaces 12, 14 of the fastener 10 may be fit to the cut out portion 123 of the prong 122 and the cutout portion 125 of the prong 124.

Referring to FIG. 3B, the end portion 114 of the removal tool 100 may be used to remove a fastener 20 (e.g., a wire harness clip, or the like). A push mount 22 (e.g., an arrow head push mount, or the like) of the fastener 20 may be inserted into the opening 130 of the removal tool 100. The end portion 114 (e.g., a periphery of the opening) may push the push mount 22 to release the push mount 22 from a respective hole that the push mount 22 is hooked thereto. For example, the end portion 114 may push two opposing sides of the push mount of the fastener 20 to release the fastener 20 from the respective hole.

Referring to FIG. 3C, the engagement portion 120 of the removal tool 100 may be used to remove a fastener 30 (e.g., a push pin clip, or the like). The distal end portion 127 of the removal tool 100 may slide in a space between a head portion 32 of the fastener 30 and a body portion 34 of the fastener to release the fastener 30. For example, a shaft portion 36 of the fastener 30 may be slide in the notch portion 126. By sliding the distal end portion 127 and the notch portion 126 further toward the fastener 30, the tapered portion 128 may gradually increase a distance between the head portion 32 and the body portion 34. As a result, the fastener 30 may be released from a respective mount.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A removal tool, comprising:

a tool body extending in a longitudinal direction having an engagement portion at one end and defining a plurality of through hole openings formed at an other end, wherein:

the engagement portion includes two prongs and defines a notch portion formed between the prongs at a distal end portion;

the notch portion extends in the longitudinal direction and is rounded at a proximal end portion, each prong has a cutout portion at the distal end portion horizontally tapered toward the notch portion; and the distal end portion has a tapered portion vertically tapered away from the distal end portion.

2. The removal tool of claim 1, wherein each of the prongs has an inner surface, the inner surfaces face each other and extend parallel to each other.

3. The removal tool of claim 1, wherein the prongs and the notch portion have substantially the same width.

4. The removal tool of claim 1, wherein the tapered portion of the distal end ends at the proximal end portion of the notch portion.

5. The removal tool of claim 1, wherein at least one through hole opening of the plurality of through hole openings is elongated.

6. The removal tool of claim 1, wherein the plurality of through hole openings are elongated in different directions.

7. The removal tool of claim 1, wherein the other end of the tool body is rounded.

8. The removal tool of claim 1, wherein the tool body is substantially straight in the longitudinal direction between the one end and the other end.

9. The removal tool of claim 1, wherein the tool body has a thickness substantially uniform between the other end and the proximal end portion of the notch portion.

10. The removal tool of claim 1, wherein the plurality of through hole openings have different shapes.

11. The removal tool of claim 6, wherein the plurality of through hole openings includes a first through hole opening elongated in the longitudinal direction and a second through hole opening elongated in a width direction.

12. The removal tool of claim 1, wherein at least one through hole opening of the plurality of through hole openings comprises a straight periphery portion and a rounded periphery portion.

* * * * *